United States Patent
Chiu et al.

(10) Patent No.: US 8,301,873 B2
(45) Date of Patent: Oct. 30, 2012

(54) METHOD AND COMPUTER SYSTEM FOR THERMAL THROTTLING PROTECTION

(75) Inventors: Chia-Chang Chiu, Hsinchu (TW); Yi-Sheng Chueh, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 421 days.

(21) Appl. No.: 12/629,022

(22) Filed: Dec. 1, 2009

(65) Prior Publication Data
US 2011/0131400 A1    Jun. 2, 2011

(51) Int. Cl.
- G06F 9/00 (2006.01)
- G06F 9/24 (2006.01)
- G06F 15/177 (2006.01)
- G06F 1/00 (2006.01)
- G06F 1/26 (2006.01)
- G06F 1/32 (2006.01)

(52) U.S. Cl. ............ 713/2; 713/1; 713/100; 713/300; 713/320; 713/322; 710/260

(58) Field of Classification Search .............. None
See application file for complete search history.

(56) References Cited

U.S. PATENT DOCUMENTS

| | | | |
|---|---|---|---|
| 5,838,578 A * | 11/1998 | Pippin | 327/512 |
| 6,415,388 B1 * | 7/2002 | Browning et al. | 713/322 |
| 6,740,289 B1 | 5/2004 | Ono et al. | |
| 6,889,332 B2 * | 5/2005 | Helms et al. | 713/322 |
| 7,467,318 B2 * | 12/2008 | Bruno et al. | 713/500 |
| 7,565,258 B2 * | 7/2009 | Duarte | 702/132 |
| 7,577,862 B2 * | 8/2009 | McClendon et al. | 713/500 |
| 7,661,003 B2 * | 2/2010 | Naffziger et al. | 713/320 |
| 8,020,038 B2 * | 9/2011 | Riedlinger et al. | 714/10 |
| 2010/0049995 A1 * | 2/2010 | Casey et al. | 713/300 |
| 2010/0153698 A1 * | 6/2010 | Chiu | 713/2 |

* cited by examiner

Primary Examiner — Ji H Bae

(57) ABSTRACT

An automatic thermal throttling protection method is described. a computer system executes a main BIOS for initializing an embedded controller when the computer system is power on or boots. And the sub BIOS of the embedded controller is also executed. The sub BIOS of the embedded controller obtains an upper temperature limit and a lower temperature limit set by the main BIOS, and obtains a temperature of the CPU through a thermal sensor. The sub BIOS of the embedded controller compares the temperature of the CPU with the upper temperature limit. When the temperature of the CPU is higher than the upper temperature limit, the sub BIOS sends a system control interrupt event to the main BIOS through the embedded controller. When receiving the SCI event, the main BIOS enables a throttling function to perform a throttling operation on the CPU or shuts down the computer system.

15 Claims, 2 Drawing Sheets

METHOD AND COMPUTER SYSTEM FOR THERMAL THROTTLING PROTECTION

BACKGROUND OF THE INVENTION

1. Field of Invention

The present invention relates to a computer system, and more particularly to an automatic thermal throttling protection method for protecting the computer system.

2. Related Art

A keyboard controller (KBC) of an ordinary computer system (for example, a notebook computer) is provided with multiple integrated function beside controlling keyboard, and is equipped with keyboard basic input/output system (keyboard BIOS) for performing specific and simple program code segment. For example, the keyboard BIOS reads a temperature of a central processing unit (CPU) of the computer system through a thermal sensor, and then compares the temperature of the CPU with a preset critical temperature. If the temperature of the CPU exceeds the critical temperature, the KBC sends a system control interrupt (SCI) through a general purpose input/output (GPIO) to a main basic input/output system (BIOS) of the computer system, such that the main BIOS executes an automatic cooling operation on the CPU, for example, a throttling the internal clock rate the CPU, or throttling the external clock rate to the CPU.

Currently, the cooling operation is controlled only by the KBC and only one fixed critical temperature of the CPU is set. Unlike the main BIOS having convenient application program and graphic user interface, parameter setting is in the KBC is very difficult. To an ordinary KBC, only one fixed critical temperature of the CPU is set, and the clock throttle rate of the throttling operation is also fixed. To change the critical temperature or the clock throttle rate, updating the KBC BIOS is requited, and updating the KBC BIOS is so inconvenient.

SUMMARY OF THE INVENTION

To solve the technical problems in the prior art, the present invention discloses an automatic thermal throttling protection method for protecting the computer system.

In one aspect of the present invention, an automatic thermal throttling protection method applied to a computer system is provided; wherein the computer system at least comprises an embedded controller, a main basic input/output system (BIOS), a sub BIOS, a central processing unit (CPU) and a thermal sensor. The method comprising the steps of: executing the main BIOS for initializing the embedded controller to execute the sub BIOS when the computer system is powered on; the sub BIOS obtaining an upper temperature limit and a lower temperature limit set by the main BIOS and obtaining a temperature of the CPU through the thermal sensor; the sub BIOS comparing the temperature of the CPU with the upper temperature limit; the sub BIOS sending a system control interrupt (SCI) event to the main BIOS when the temperature of the CPU is higher than the upper temperature limit; and the main BIOS enabling a throttling function to perform a throttling operation on the CPU or shutting down the computer system when receiving the SCI event.

In another aspect of the present invention, a computer system comprising: a central processing unit (CPU); a thermal sensor for detecting the temperature of the CPU; a main basic input/output system (BIOS), executed when the computer system is powered on; an embedded controller initialized by the main BIOS, and a sub BIOS executed by the embedded controller to obtain an upper temperature limit and a lower temperature limit set by the main BIOS, wherein the sub BIOS compares the temperature of the CPU detected by the thermal sensor with the upper temperature limit and sends a system control interrupt (SCI) event to the main BIOS through the embedded controller when the temperature of the CPU is higher than the upper temperature limit; wherein when receiving the SCI event, the main BIOS enables a throttling function to perform a throttling operation on the CPU or shuts down the computer system.

In another aspect of the present invention, a storage medium is provided to store a computer program having a plurality of program code segment, wherein the program code segment are for being loaded to a computer system and enabling the computer system to execute an automatic thermal throttling protection method, and the computer system at least comprises an embedded controller, a main basic input/output system (BIOS), a sub BIOS, a central processing unit (CPU) and a thermal sensor, and the automatic thermal throttling protection method comprises: executing the main BIOS for initializing the embedded controller to execute the sub BIOS when the computer system is powered on; the sub BIOS obtaining an upper temperature limit and a lower temperature limit set by the main BIOS and obtaining a temperature of the CPU through the thermal sensor; the sub BIOS comparing the temperature of the CPU with the upper temperature; the sub BIOS sending a system control interrupt (SCI) event to the main BIOS when the temperature of the CPU is higher than the upper temperature limit; and the main BIOS enabling a throttling function to perform a throttling operation on the CPU or shutting down the computer system when receiving the SCI event.

These and other features, aspects, and advantages of the present invention will become better understood with reference to the following description and appended claims. It is to be understood that both the foregoing general description and the following detailed description are examples, and are intended to provide further explanation of the invention as claimed.

DETAILED DESCRIPTION OF THE INVENTION

Accordingly, a preferred embodiment of the present invention provides an automatic thermal throttling protection method utilizing main basic input/output system (BIOS) of the computer system and keyboard controller BIOS (KBC BIOS) of a keyboard controller (KBC), so as to establish a mechanism and a function for monitoring temperature in the computer system. The main BIOS sets different critical temperatures and throttling functions corresponding to the critical temperatures in the computer system. The KBC BIOS, having preset executing routines, is executed by the main BIOS to monitoring the current temperature of the CPU. When the computer system is powered on, the main BIOS sets a critical temperature at first and then send the critical temperature to the KBC and the KBC BIOS, and the KBC BIOS monitors the temperature CPU through KBC and determines whether the temperature of the CPU is higher or lower than the critical temperature. When the KBC detects that the temperature of the CPU is higher or lower than the critical temperature, the KBC sends a system control interrupt (SCI) event or a system management interrupt (SMI) event to the main BIOS, so that the main BIOS performs clock rate throttling or cooling operation to the CPU.

Figure 1:
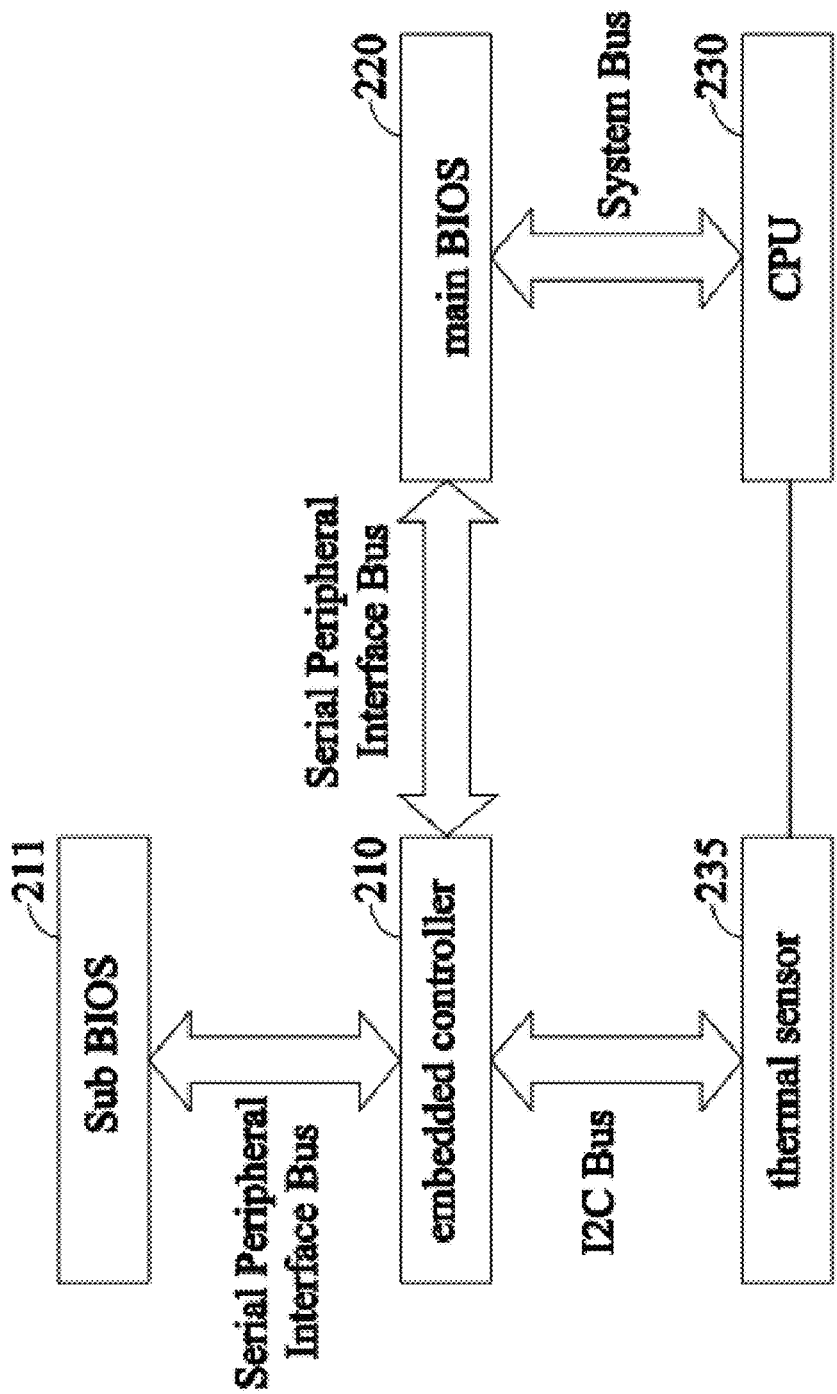
FIG. 1 is a block diagram of a computer system according to an embodiment of the present invention.

Referring to FIG. 1, a block diagram of a computer system according an embodiment of the invention is shown.

The computer system according to the embodiment of the invention at least includes an embedded controller 210 having a sub basic input/output system (BIOS) 211, a main BIOS 220, a central processing unit (CPU) 230, and a thermal sensor 235. The other ordinary fundamental components of a computer system such as system memory and bridge chip such as south bridge are omitted instead of being shown. Moreover, the implementation of the computer system according to the embodiment of the invention can be a laptop computer.

The embedded controller 210 at least includes a keyboard controller (KBC) and an embedded control unit (not shown in the figure). The KBC is basically provided for receiving and processing input signal of a user through the keyboard. The embedded control unit and the KBC are integrated with each other and at least control the touch pad, charge and discharge of the battery, temperature monitoring, management of the power and fans according to the executing routines of the sub BIOS 211. When the computer system is shut down, the embedded controller 210 and real time clock (RTC) of the computer system remain working.

The embedded controller 210 is electrically connected to thermal sensor 235 through I2C Bus, and thermal sensor 235 is directly disposed to the CPU 230 to detect the temperature of the CPU 230.

Through the system Bus, the CPU 230 is electrically connected to the system memory (not shown in the figures), the bridge chip (not shown in the figures), and the main BIOS 220. The main BIOS 220 at least includes system routines stored in a specific memory. The system routines include POST, hardware initialization, system setup according to preset system configuration, providing resident routine library, and loading OS. In the embodiment, the main BIOS 220 further includes a preset upper temperature limit and a preset lower temperature limit.

Through the Serial Peripheral Interface Bus (SPI Bus), the main BIOS 220 and the embedded controller 210 are electrically connected to each other. When the computer system is booting, the embedded controller 210 generates a System Control Interrupt (SCI) signal or a System Management Interrupt (SMI) signal and sends the signal to the main BIOS 220 through the General Purpose Input/Output (GPIO) pins. In the automatic thermal throttling method of the present invention, parts of the steps are system routines of the main BIOS 220.

The sub BIOS 211 and the embedded controller 210 are electrically connected to each other through SPI Bus. The sub BIOS 211 at least includes executing routines stored in another preset memory, and the executing routines at least include routines controlling operation of keyboard and touch pad, charge and discharge of the battery, temperature monitoring, management of the power and fans. In the automatic thermal throttling protection method of the present invention, parts of the steps are executing routines of the sub BIOS 211. Currently, there is no applicable application program for quickly changing configuration of the sub BIOS 211 due to the limitations of the sub BIOS 211. The sub BIOS 211 and the main BIOS are tie-in to perform the automatic thermal throttling protection method of the invention.

Figure 2:
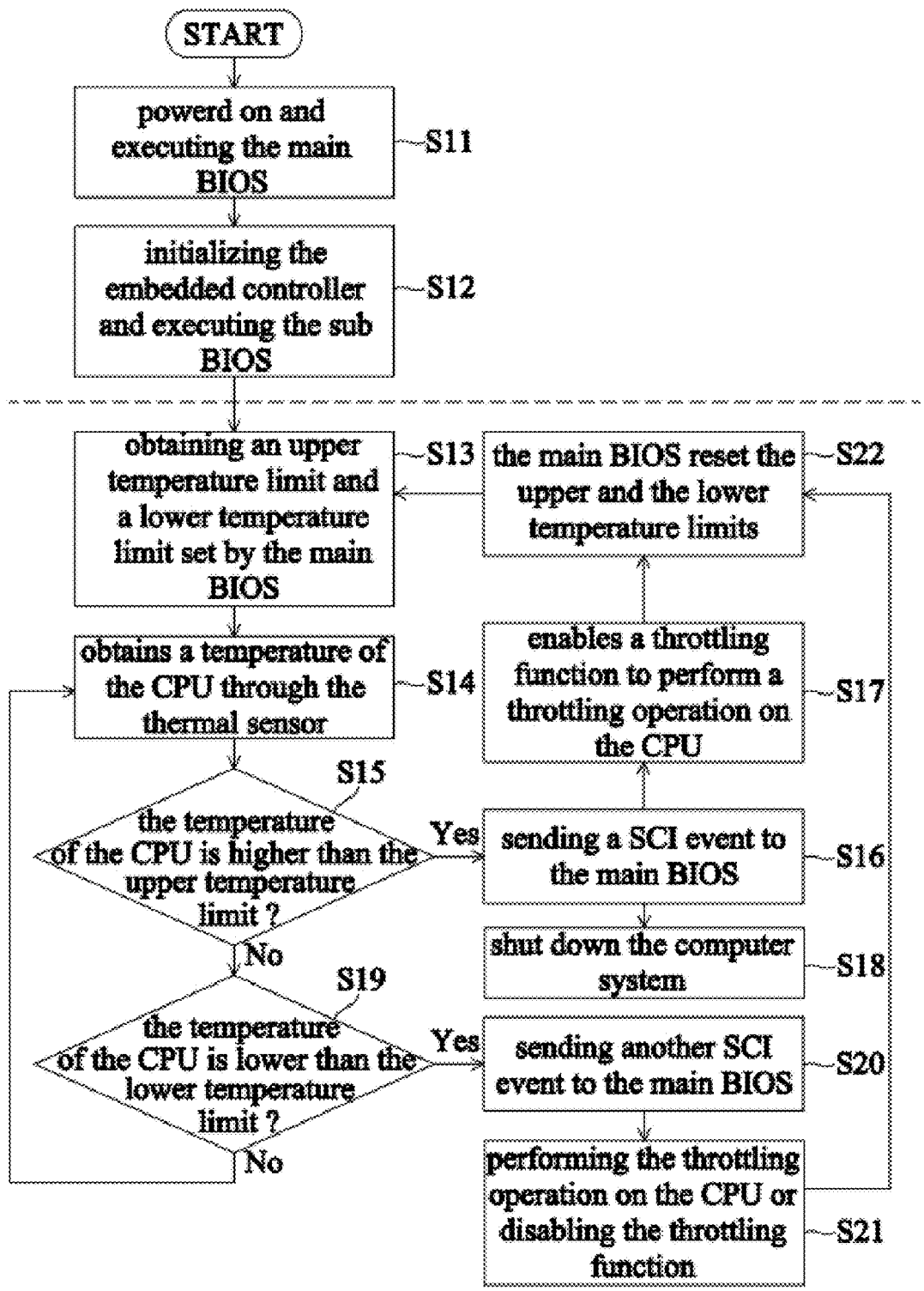
FIG. 2 is a flow chart of an automatic thermal throttling protection method according to an embodiment of the present invention.

FIG. 2 is a flow chart of the automatic thermal throttling protection method according to the embodiment of the invention.

When the computer system is powered on, the computer system executes the main BIOS 220 (S11). Then the main BIOS 220 initializes the embedded controller 210 and the embedded controller 210 executes the sub BIOS 211 (S12). Next, through the embedded controller 210, the sub BIOS 211 obtains an upper temperature limit and a lower temperature limit set by the main BIOS (S13). On the other hand, the sub BIOS 211 also obtains a temperature of the CPU through the thermal sensor (S14). The sub BIOS 211 compares the temperature of the CPU with the upper temperature limit (S15), so as to determine whether the temperature of the CPU is higher than the upper temperature limit.

When the temperature of the CPU is higher than the upper temperature limit, the sub BIOS 211 sends a system control interrupt (SCI) or a system management interrupt (SMI) event (higher than the upper temperature limit) to the main BIOS 220 (S16). When receiving the SCI or the SMI event, the main BIOS 220 enables a throttling function to perform a throttling operation on the CPU 230 (S17), such that the clock rate of the CPU is reduced to lower the temperature. Or the main BIOS 220 shuts down the computer system when receiving the SCI or the SMI event (S18), the computer system would not work until the computer system is powered on again.

When the temperature of the CPU is not higher than the upper temperature limit, the sub BIOS 211 compares the temperature of the CPU 230 with the lower temperature limit, so as to determine whether the temperature of the CPU is lower than the lower temperature limit (S19). When the temperature of the CPU is lower than the lower temperature limit, the sub BIOS 211 sends another SCI or SMI event (lower than the lower limit temperature) to the main BIOS 220 (S20). When receiving the SCI or the SMI event, the main BIOS 220 performs another throttling operation on the CPU, such that the clock rate of the CPU is raised, or disables the throttling function, such that the CPU operates at a full speed (S21).

After performing the throttling operation or disabling the throttling function, the main BIOS 220 resets the upper temperature limit and the lower temperature limit (S22), and transmits the reset upper temperature limit and the reset lower temperature limit to the embedded controller and the sub BIOS 211 (S22). When the temperature of the CPU is not lower than the lower temperature limit, the sub BIOS continuously obtains the temperature of the CPU detected by the thermal sensor 235 through the embedded controller 210 (S14), and S15-S22 are repeated.

When receiving the reset upper temperature limit and the reset lower temperature limit, the sub BIOS 211 monitors the temperature of the CPU 230 through the embedded controller 210 and compares the temperature of the CPU 230 with the reset upper temperature limit and the reset lower temperature limit, so as to determine whether the temperature of the CPU 230 is higher than the upper temperature limit or lower than the lower temperature limit, that is, S14-S22 are repeated.

For example, when the temperature of the CPU is higher than 50° C., the clock rate of the CPU 230 is throttled to 50% of the full speed. When the temperature of the CPU 230 is higher than 60° C., the clock rate of the CPU 230 is throttled to 25% of the full speed. When the temperature of the CPU 230 is higher than 70° C., the clock rate of the CPU 230 is throttled to 12.5% of the full speed. When the temperature of the CPU 230 is higher than 90° C., the computer system is shut down. When the temperature of the CPU 230 is lower than 50° C., the throttling function is disabled, and so forth. In addition to enabling the throttling function, the CPU may be made to be in an idle state in most of the time, or a screen brightness of the computer system is reduced, so as to lower the temperature.

In the automatic thermal throttling protection method according to the embodiment of the present invention, a plurality of upper temperature limits and lower temperature limits are easily set by changing the configuration of the main BIOS 220, and the corresponding cooling operation is performed by the embedded controller 210 having the sub BIOS 211 according to the received event.

The present invention further provides a storage medium (for example, an optical disk, a magnetic disk, or a removable hard disk), which stored a computer readable authority approval program, for executing the automatic thermal throttling protection method. Here, the authority approval program stored on the storage medium includes a plurality of program code segments (for example, a organization chart creating program code segment, an approval sheet program code segment, a setting program code segment, and an deployment program code segment), and the functions of the program code segments are corresponding to the steps of the method and the functional block diagram of the system.

That is, the present invention provides a storage medium for storing a computer program having a plurality of program code segments. The program code segments are provided for being loaded to a computer system, so as to enable the computer system to execute the following automatic thermal throttling protection method. The computer system at least includes an embedded controller 210, a main BIOS 220, a sub BIOS 211, a central processing unit 230, and a thermal sensor 235. The method executed by the computer system after loading the storage medium includes the flowing steps. First, when the computer system is powered on, the computer system executes the main BIOS 220 for initializing the embedded controller 210, and then the embedded controller 210 executes the sub BIOS 211. Next, the sub BIOS 211 obtains an upper temperature limit and a lower temperature limit set by the main BIOS 220, and obtains a temperature of the CPU 230 through the thermal sensor 235. The sub BIOS 211 compares the temperature of the CPU 230 with the upper temperature. When the temperature of the CPU 230 is higher than the upper temperature, the sub BIOS 211 sends a system control interrupt (SCI) event to the main BIOS 220. When the main BIOS 220 receives the SCI event, the main BIOS 220 enables a throttling function to perform a throttling operation on the CPU 230 or shutting down the computer system when receiving the SCI event.

What is claimed is:

1. An automatic thermal throttling protection method, applied to a computer system, wherein the computer system at least comprises an embedded controller, a main basic input/output system (BIOS), a sub BIOS, a central processing unit (CPU), and a thermal sensor, the method comprising the steps of:

executing the main BIOS for initializing the embedded controller to execute the sub BIOS when the computer system is powered on;

the sub BIOS obtaining an upper temperature limit and a lower temperature limit set by the main BIOS and obtaining a temperature of the CPU through the thermal sensor;

the sub BIOS comparing the temperature of the CPU with the upper temperature limit;

the sub BIOS sending a system control interrupt (SCI) event to the main BIOS when the temperature of the CPU is higher than the upper temperature limit; and the main BIOS enabling a throttling function to perform a throttling operation on the CPU or shutting down the computer system when receiving the SCI event.

2. The automatic thermal throttling protection method according to claim 1, further comprising the steps of:

the sub BIOS comparing the temperature of the CPU with the lower temperature limit when the temperature of the CPU is not higher than the upper temperature limit;

the sub BIOS sending another SCI event to the main BIOS when the temperature of the CPU is lower than the lower temperature limit; and the main BIOS performing another throttling operation on the CPU or disabling the throttling function when receiving the another SCI event.

3. The automatic thermal throttling protection method according to claim 2, further comprising the steps of:

the main BIOS resetting the upper temperature limit and the lower temperature limit, and transmitting the reset upper temperature limit and the reset lower temperature limit to the sub BIOS after performing the another throttling operation or disabling the throttling function.

4. The automatic thermal throttling protection method according to claim 3, further comprising the steps of:

the sub BIOS continuously obtaining the temperature of the CPU detected by the thermal sensor through the embedded controller, and repeatedly comparing the temperature of the CPU with the lower temperature limit when the temperature of the CPU is not lower than the lower temperature limit.

5. The automatic thermal throttling protection method according to claim 4, further comprising:

the sub BIOS monitoring the temperature of the CPU through the embedded controller and comparing the temperature of the CPU with the reset upper temperature limit and the reset lower temperature limit when receiving the reset upper temperature limit and the reset lower temperature limit, so as to determine whether the temperature of the CPU is higher than the reset upper temperature limit or lower than the reset lower temperature limit.

6. A computer system, comprising:

a central processing unit (CPU);

a thermal sensor for detecting the temperature of the CPU;

a main basic input/output system (BIOS), executed when the computer system is powered on; and an embedded controller initialized by the main BIOS, and a sub BIOS executed by the embedded controller to obtain an upper temperature limit and a lower temperature limit set by the main BIOS, wherein the sub BIOS compares the temperature of the CPU detected by the thermal sensor with the upper temperature limit and sends a system control interrupt (SCI) event to the main BIOS through the embedded controller when the temperature of the CPU is higher than the upper temperature limit, wherein when receiving the SCI event, the main BIOS enables a throttling function to perform a throttling operation on the CPU or shuts down the computer system.

7. The computer system according to claim 6, wherein the sub BIOS compares the temperature of the CPU with the lower temperature limit when the temperature of the CPU is not higher than the upper temperature limit and sends another SCI event to the main BIOS through the embedded controller when the temperature is lower than the lower temperature limit, the embedded controller sends another SCI event to the BIOS, and when receiving the another SCI event, the main BIOS performs another throttling operation on the CPU or disables the throttling function.

8. The computer system according to claim 7, wherein the main BIOS resets the upper temperature limit and the lower temperature limit, and transmits the reset upper temperature limit and the reset lower temperature limit to the sub BIOS after performing the another throttling operation or disabling the throttling function.

9. The computer system according to claim 8, wherein the sub BIOS continuously obtains the temperature of the CPU detected by the thermal sensor through the embedded controller, and repeatedly compares the temperature of the CPU with the lower temperature limit when the temperature of the CPU is not lower than the lower temperature limit.

10. The computer system according to claim 9, wherein the sub BIOS monitors the temperature of the CPU through the embedded controller and compares the temperature of the CPU with the reset upper temperature limit and the reset lower temperature limit when receiving the reset upper temperature limit and the reset lower temperature limit, so as to determine whether the temperature of the CPU is higher than the reset upper temperature limit or lower than the reset lower temperature limit.

11. A non-transitory storage medium storing a computer program with a plurality of program code segment, wherein the program code segment are used for being loaded to a computer system and enabling the computer system to execute an automatic thermal throttling protection method, and the computer system at least comprising an embedded controller, a main basic input/output system (BIOS), a sub BIOS, a central processing unit (CPU) and a thermal sensor, the automatic thermal throttling protection method comprising the steps of:

executing the main BIOS for initializing the embedded controller to execute the sub BIOS when the computer system is powered on;

the sub BIOS obtaining an upper temperature limit and a lower temperature limit set by the main BIOS and obtaining a temperature of the CPU through the thermal sensor;

the sub BIOS comparing the temperature of the CPU with the upper temperature;

the sub BIOS sending a system control interrupt (SCI) event to the main BIOS when the temperature of the CPU is higher than the upper temperature limit; and the main BIOS enabling a throttling function to perform a throttling operation on the CPU or shutting down the computer system when receiving the SCI event.

12. The storage medium according to claim 11, wherein the sub BIOS comparing the temperature of the CPU with the lower temperature limit when the temperature of the CPU is not higher than the upper temperature limit;

the sub BIOS sending another SCI event to the main BIOS through the embedded controller when the temperature of the CPU is lower than the lower temperature limit; and the main BIOS performing another throttling operation on the CPU or disabling the throttling function when receiving the another SCI event.

13. The storage medium according to claim 12, wherein The main BIOS resetting the upper temperature limit and the lower temperature limit and transmitting the reset upper temperature limit and the reset lower temperature limit to the sub BIOS after performing the another throttling operation or disabling the throttling function.

14. The storage medium according to claim 13, wherein the sub BIOS continuously obtaining the temperature of the CPU detected by the thermal sensor through the embedded controller, and repeatedly comparing the temperature of the CPU with the lower temperature limit when the temperature of the CPU is not lower than the lower temperature limit.

15. The storage medium according to claim 14, wherein:

the sub BIOS monitoring the temperature of the CPU through the embedded controller and comparing the temperature of the CPU with the reset upper temperature limit and the reset lower temperature limit when receiving the reset upper temperature limit and the reset lower temperature limit, so as to determine whether the temperature of the CPU is higher than the reset upper temperature limit or lower than the reset lower temperature limit.

* * * * *